United States Patent [19]
Apelian et al.

[11] Patent Number: 5,264,116
[45] Date of Patent: Nov. 23, 1993

[54] PRODUCTION OF LUBRICANTS BY HYDROCRACKING AND HYDROISOMERIZATION

[75] Inventors: Minas R. Apelian, Vinceton; Thomas F. Degnan, Jr., Moorestown; David O. Marler, Deptford; Dominick N. Mazzone, Wenonah, all of N.J.

[73] Assignee: Mobil Oil Corporation, Fairfax, Va.

[21] Appl. No.: 734,999

[22] Filed: Jul. 24, 1991

[51] Int. Cl.$^5$ ............ C10G 47/02; C10G 47/04; C10G 47/20
[52] U.S. Cl. .................. 208/111; 585/734; 585/739; 585/752; 208/27; 208/107; 208/108
[58] Field of Search ........................ 208/111

[56] References Cited

U.S. PATENT DOCUMENTS

| | | | |
|---|---|---|---|
| 3,884,835 | 5/1975 | Vaughan | 252/451 |
| 4,091,079 | 5/1978 | Vaughan | 423/328 |
| 4,673,559 | 6/1987 | Derouane et al. | 423/329 |
| 4,791,088 | 12/1988 | Chu et al. | 502/232 |
| 4,880,611 | 11/1989 | von Ballmoos et al. | 423/306 |
| 4,919,788 | 4/1990 | Chen et al. | 208/49 |
| 4,975,177 | 12/1990 | Garwood et al. | 208/27 |
| 5,105,051 | 4/1992 | Pertine | 585/528 |
| 5,118,894 | 4/1992 | Quang Le | 585/446 |

OTHER PUBLICATIONS

Szostak, Zeilites, Facts, Figures, Futures, Ed. Jacobs et al. Elservier Science Publ.bV, 1989, pp. 439-446.

Primary Examiner—Helane Myers
Attorney, Agent, or Firm—Alexander J. McKillop; Malcolm D. Keen

[57] ABSTRACT

A process for producing high quality lubricants by the hydrocracking and hydroisomerization of petroleum waxes uses a catalyst which is based on an ultra-large pore crystalline material. The crystalline material exhibits unusually large pores of at least 13 Å diameter and a high sorption capacity demonstrated by its benzene adsorption capacity of greater than about 15 grams benzene/100 grams at 50 torr and 25° C. The crystalline material is characterized by an X-ray diffraction pattern with at least one d-spacing greater than about 18 Å and in a particularly preferred form, a hexagonal arrangement of pores of at least 13 Å diameter which can be indexed with a $d_{100}$ value greater than about 18 Å. The hydrocracking catalysts based on these materials are capable of producing lube products with a high VI of at least 120 and usually higher, values of 135 and higher e.g. 143. the lube products are produced in good yield from feeds which may contain down to about 30 percent wax content, although wax contents of at least 50 percent are preferred for the highest quality products. The catalysts achieve this result without the use of fluorine or other promoters.

35 Claims, 4 Drawing Sheets

PRODUCTION OF LUBRICANTS BY HYDROCRACKING AND HYDROISOMERIZATION

CROSS REFERENCE TO RELATED APPLICATIONS

This application is related to application Ser. No. 07/734,971, filed, which relates to lube hydrocracking over catalysts comprising mesoporous crystalline materials. It is also related to application Ser. No. 07/734,826, filed concurrently, which is directed to the production of high quality lubestocks by two stage hydroprocessing using an ultra-large pore size catalyst. Application Ser. No. 07/734,987, filed concurrently discloses high metal content catalysts which may be used in the present process.

Co-pending application Ser. No. 07/548,702 relates to the production of high quality lubricants by hydrocracking and hydroisomerization. Application Ser. No. 07/548,701 relates to the production of lubricants by the hydroisomerization of petroleum waxes.

The crystalline catalytic materials used in the present process are described in copending application Ser. No. 07/625,245 (C. T. Kresge et al) filed Dec. 10, 1990, now U.S. Pat. No. 5,102,643 which is a continuation-in-part of Ser. No. 07/470,008, filed Jan. 25, 1990 now U.S. Pat. No. 5,102,643.

FIELD OF THE INVENTION

This invention relates to the production of high viscosity index lubricants by hydrocracking mineral oil feedstocks, especially petroleum waxes.

BACKGROUND OF THE INVENTION

Mineral oil based lubricants are conventionally produced by a separative sequence carried out in the petroleum refinery which comprises fractionation of a paraffinic crude oil under atmospheric pressure followed by fractionation under vacuum to produce distillate fractions (neutral oils) and a residual fraction which, after deasphalting and severe solvent treatment may also be used as a lubricant basestock usually referred to as bright stock. Neutral oils, after solvent extraction to remove low viscosity index (V.I.) components are conventionally subjected to dewaxing, either by solvent or catalytic dewaxing processes, to the desired pour point, after which the dewaxed lubestock may be hydrofinished to improve stability and remove color bodies. This conventional technique relies upon the selection and use of crude stocks, usually of a paraffinic character, which produce the desired lube fractions of the desired qualities in adequate amounts. The range of permissible crude sources may, however, be extended by the lube hydrocracking process which is capable of utilizing crude stocks of marginal or poor quality, usually with a higher aromatic content than the best paraffinic crudes. The lube hydrocracking process, which is well established in the petroleum refining industry, generally comprises an initial hydrocracking step carried out under high pressure in the presence of a bifunctional catalyst which effects partial saturation and ring opening of the aromatic components which are present in the feed. The hydrocracked product is then subjected to dewaxing in order to reach the target pour point since the products from the initial hydrocracking step which are paraffinic in character include components with a relatively high pour point which need to be removed in the dewaxing step.

In theory, as well as in practice, lubricants should be highly paraffinic in nature since paraffins possess the desirable combination of low viscosity and high viscosity index. Normal paraffins and slightly branched paraffins e.g. n-methyl paraffins, are waxy materials which confer an unacceptably high pour point on the lube stock and are therefore removed during the dewaxing operations in the conventional refining process described above. It is, however, possible to process waxy feeds in order to retain many of the benefits of their paraffinic character while overcoming the undesirable pour point characteristic. A severe hydrotreating process for manufacturing lube oils of high viscosity index is disclosed in *Developments in Lubrication* PD 19(2), 221-228, S. Bull et al, and in this process, waxy feeds such as waxy distillates, deasphalted oils and slack waxes are subjected to a two-stage hydroprocessing operation in which an initial hydrotreating unit processes the feeds in blocked operation with the first stage operating under higher temperature conditions to effect selective removal of the undesirable aromatic compounds by hydrocracking and hydrogenation. The second stage operates under relatively milder conditions of reduced temperature at which hydrogenation predominates, to adjust the total aromatic content and influence the distribution of aromatic types in the final product. The viscosity and flash point of the base oil are then controlled by topping in a subsequent redistillation step after which the pour point of the final base oil is controlled by dewaxing in a solvent dewaxing (MEK-toluene) unit. The slack waxes removed from the dewaxer may be reprocessed to produce a base oil of high viscosity index. Processes of this type, employing a waxy feed which is subjected to hydrocracking over an amorphous bifunctional catalyst such as nickel-tungsten on alumina or silica-alumina are disclosed, for example, in British Patents Nos. 1,429,494, 1,429,291 and 1,493,620 and U.S. Pat. Nos. 3,830,273, 3,776,839, 3,794,580, and 3,682,813.

In processes of this kind, the hydrocracking catalyst is typically a bifunctional catalyst containing a metal hydrogenation component on an amorphous acidic support. The metal component is usually a combination of base metals, with one metal selected from the iron group (Group VIII) and one metal from Group VIB of the Periodic Table, for example, nickel in combination with molybdenum or tungsten. The activity of the catalyst may be increased by the use of fluorine, either by incorporation into the catalyst during its preparation in the form of a suitable fluorine compound or by in situ fluoriding during the operation of the process, as disclosed in GB 1,390,359.

Although the lube hydrocracking process using an amorphous catalyst for the treatment of the waxy feeds has shown itself to be capable of producing high V.I. lubricants, it is not without its limitations. In particular, there are environmental and metallurgical (corrosion) concerns asociated with the use of fluorine and other promoters used with these catalysts; the unfluorided catalysts do not have sufficient cracking activity to be commercially viable for these applications. While the amorphous catalysts are effective for the saturation of the aromatics under the high pressure conditions which are typically used in lube hydrocracking (about 2,000 psig) their activity and selectivity for isomerization of the paraffinic components is not as high as might be desired; the relatively straight chain paraffins are not, therefore, isomerized to the less waxy isoparaffins of relatively high viscosity index but with low pour point properties, to the extent required to fully meet product pour point specifications.

Crystalline materials, especially the large pore size zeolites such as zeolites X and Y, have been found to be useful for a number of hydrocracking applications since they have the advantage, as compared to the amorphous materials, of possessing a greater degree of activity, which enables the hydrocracking to be carried out at lower temperatures at which the accompanying hydrogenation reactions are thermodynamically favored. In addition, the crystalline catalysts tend to be more stable in operation than the amorphous materials such as alumina. The crystalline materials may, however, not be suitable for all applications since even the largest pore sizes in these materials, typically about 7.4 Å in the X and Y zeolites, are too small to permit access by various bulky species in the feed, such as the high molecular weight species in lube feeds. As a result, the crystalline zeolite catalysts, while very active for boiling range conversion, are not as selective in terms of high lube yield and yield selectivity. For these reasons, lube hydrocracking processes have not used the crystalline catalysts but, instead, have remained with the promoted amorphous catalysts.

One approach to the production of lubes from unconventional refinery streams using crystalline catalysts is disclosed in U.S. Pat Nos. 4,919,788 and 4,975,177. In this process, a zeolite beta catalyst is used to isomerize the high molecular weight paraffins contained in the back end of the feed to less waxy materials while minimizing cracking of these components to materials boiling outside the lube range. The waxy paraffins in the front end of the feed are removed in a subsequent dewaxing step, either solvent or catalytic, in order to achieve the target pour point. While this zeolite-catalyzed process has shown itself to be highly effective for dealing with waxy, highly paraffinic feeds, the high isomerization selectivity of the zeolite beta catalysts, coupled with its lesser capability to remove low quality aromatic components, has tended to limit the application of the process to feeds which contain relatively low quantities of aromatics.

Application Ser. No. 07/548,702 now abandoned discloses a process for the production of high quality lubricants by hydrocracking and hydroisomerization of petroleum feeds in a two-stage procedure in which an amorphous hydrocracking catalyst is used in the first stage to convert aromatics to paraffins and cyclic components followed by a crystalline zeolite catalyst in the second stage to convert the paraffins to iso-paraffins of lower pour point. Application Ser. No. 07/548,701 now abandoned relates to the production of lubricants by the hydroisomerization of petroleum waxes in a single stage process.

In spite of their shortcomings the amorphous catalysts have remained the catalysts of choice for lube hydrocracking even though from some points of view the crystalline catalysts would appear to offer advantages, at least, in some respects. Clearly, however, it would be desirable to develop a process for producing lubes from unconventional sources or from refinery streams of marginal or unacceptable quality. It would also be desirable to develop a lube hydrocracking process using a catalyst possessing the activity and stability of the crystalline materials coupled with the ability of the amorphous materials to handle the bulky molecular species associated with lube range feeds and products.

SUMMARY OF THE INVENTION

We have now found that mesoporous siliceous materials may be used as the basis for lube hydroprocessing catalysts of excellent properties. The catalysts based on these novel materials are capable of functioning as highly effective lube hydrocracking and hydroisomerization catalysts for producing high VI lubricating oils without the use of promoters such as fluorine. According to the present invention, these catalysts are used to hydroprocess petroleum waxes into lube products of high VI. The products typically have VI values of at least 120 and, with the preferred types of feed, higher quality materlas may be produced with VI values, for example, of at least 135. These values are obtained in a process utilizing a single characteristic processing step.

The mesoporous siliceous materials used in the catalysts have a novel and unique pore geometry and, in a preferred form described below, are characterized by a substantially uniform hexagonal honeycomb microstructure with uniform pores having a cell diameter greater than 13 Å and typically in the range of 20 to 100 Å. Most prominent among these materials is a new metallosilicate identified as MCM-41 which is usually synthesized with Bronsted acid sites by incorporating a tetrahedrally coordinated trivalent element such as Al, Ga, B, or Fe within the silicate framework. Aluminosilicate materials of this type possess good thermal and chemical stability and may be used as the basis for LHDC catalysts which exhibit the correct balance of hydrocracking activity and aromatic saturation selectivity to produce conventional high VI lubricating oils, at least 135 VI from waxy feeds in a single stage process in good yields. Furthermore, the present catalysts exhibit improved wax conversion activity compared to conventional amorphous fluorided catalysts. Thus, the present process involves lube hydrocracking and hydroisomerization of petroleum wax feeds utilizing unpromoted (without the addition of flourine) ultra large pore size molecular sieve catalysts to produce high VI lubricating oils.

The unpromoted LHDC catalysts based on the mesoporous crystalline materials, as described below, for example, NiW/MCM-41, have the correct balance of cracking activity and lube yield/VI selectivity to make them very attractive alternatives to current flourided NiW/alumina catalysts. The present mesoporous catalysts result in higher lube yield/VI selectivity compared to USY and unfluorided amorphous catalysts and they also have very good activity compared to the amorphous catalysts in the same application.

FEEDSTOCK

Figure 1:
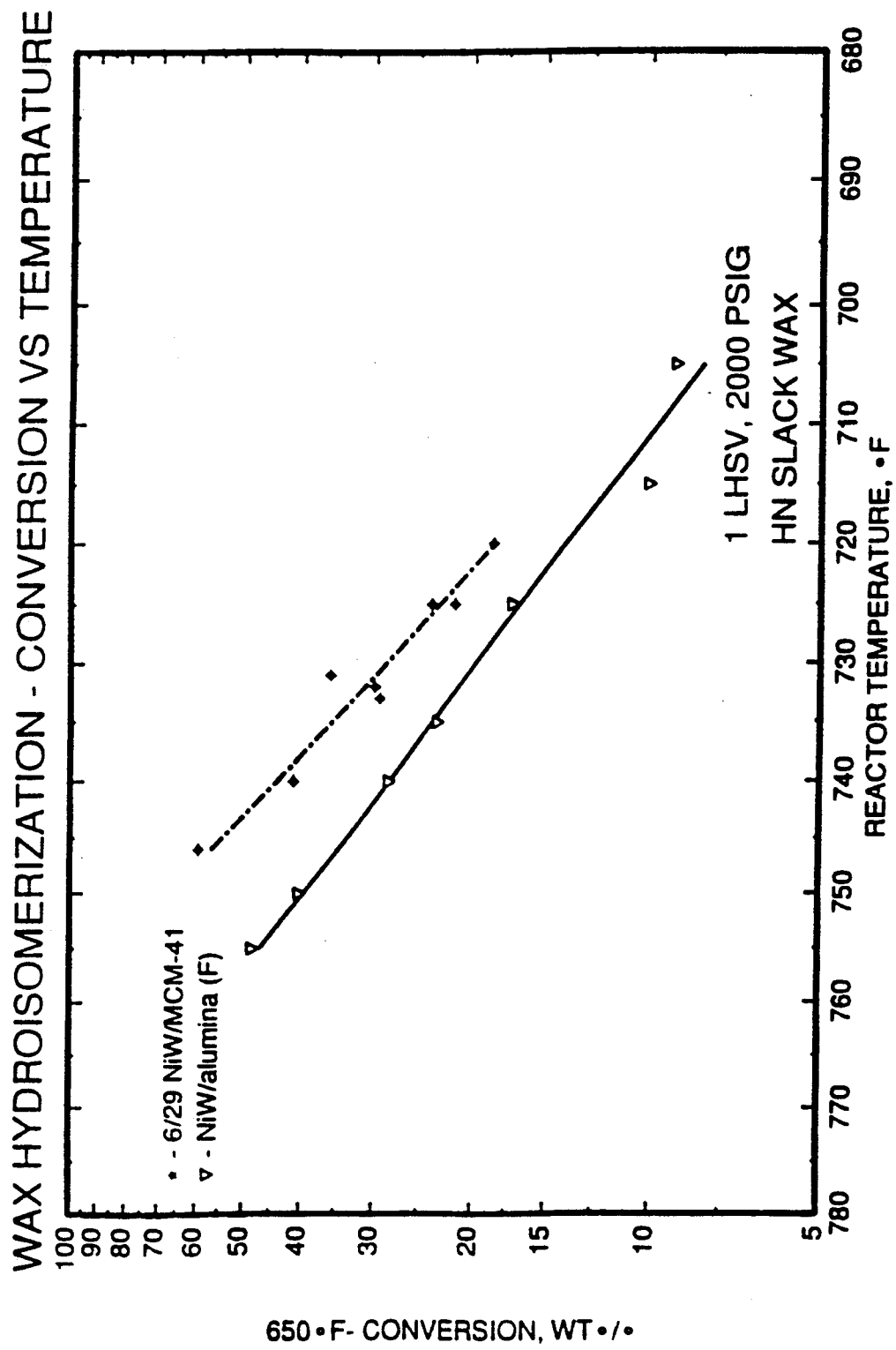
FIGS. 1 to 4 of the accompanying drawings are graphs showing the relationship between process and product characteristics for lube products produced by the hydrocracking and hydroisomerization of a wax feed with various catalysts, as described below in the Examples.

The feed to the process comprises a petroleum wax which contains at least 30, and preferably at least about 50, weight percent wax, as determined by ASTM test D-3235. In these feeds of mineral oil origin, the waxes are mostly paraffins of high pour point, comprising straight chain and slightly branched chain paraffins such as methylparaffins. Product quality and yield are directly related to the feed wax content in that a high wax level in the feed can be converted into a high level of high VI, low pour, iso-paraffins in the product while maintaining a high lube (650° F+) yield. Lower wax levels in the feed imply a higher oil (non-wax) content and because the oil contains components of lower lube quality, mostly cyclic materials such as aromatics and polynaphthenes, this trnslates into a lower product quality unless these low quality components are removed, implying a lower yield. For these reasons, the use of the high wax content (50 percent minimum wax) feeds is preferred but not indispensable at the expense of product quality or yield.

Petroleum waxes, that is, waxes of paraffinic character are derived from the refining of petroleum and other liquids by physical separation from a wax-containing refinery stream, usually by chilling the stream to a temperature at which the wax separates, usually by solvent dewaxing, e.g., MEK/toluene dewaxing or by means of an autorefrigerant process such as propane dewaxing. These waxes have high initial boiling points above about 650° F. (about 345° C.) which render them extremely useful for processing into lubricants which also require an initial boiling point of at least 650° F. (about 345° C.). The presence of lower boiling components is not to be excluded since they will be removed together with products of similar boiling range produced during the processing during the separation steps which follow the characteristic processing steps. Since these components will, however, load up the process units they are preferably excluded by suitable choice of feed cut point. The end point of wax feeds derived from the solvent dewaxing of neutral oils i.e. distillate fractions produced by the vacuum distillation of long or atmospheric resids will usually be not more than about 1100° F. (about 595° C.) so that they may normally be classified as distillate rather than residual streams but high boiling wax feeds such as petrolatum waxes i.e. the waxes separated from bright stock dewaxing, which may typically have an end point of up to about 1300° F. (about 705° C.), may also be employed.

The wax content of the feed is high, at least 30, more usually at least 50 weight percent for lube products with a VI of at least 135 or higher. Normally, for the highest quality products, feeds with a wax content of 60 to 80 weight percent are preferred. The balance in each case is from occluded oil comprising iso-paraffins, aromatics and naphthenics. The non-wax content of aromatics, polynaphthenes and highly branched naphthenes will normally not exceed about 40 weight percent of the wax and preferably will not exceed 25 to 30 weight percent. These waxy, highly paraffinic wax stocks usually have low viscosities because of their relatively low content of aromatics and naphthenes although the high content of waxy paraffins gives them melting points and pour points which render them unacceptable as lubricants without further processing.

Feeds of this type will normally be slack waxes, that is, the waxy product obtained directly from a solvent dewaxing process, e.g. an MEK or propane dewaxing process. The slack wax, which is a solid to semi-solid product, comprising mostly highly waxy paraffins (mostly n- and mono-methyl paraffins) together with occluded oil, may be fed directly to the first step of the present processing sequence as described below without the requirement for any initial preparation, for example, by hydrotreating.

The composition of some typical waxes are given in Table 1 below.

TABLE 1

| Wax Composition - Arab Light Crude | | | | |
|---|---|---|---|---|
| | A | B | C | D |
| Paraffins, wt. pct. | 94.2 | 81.8 | 70.5 | 51.4 |
| Mono-naphthenes, wt. pct. | 2.6 | 11.0 | 6.3 | 16.5 |
| Poly-naphthenes, wt. pct. | 2.2 | 3.2 | 7.9 | 9.9 |
| Aromatics, wt. pct. | 1.0 | 4.0 | 15.3 | 22.2 |

A typical slack wax feed has the composition shown in Table 2 below. This slack wax is obtained from the solvent (MEK) dewaxing of a 300 SUS (65 cST) neutral oil obtained from an Arab Light crude.

TABLE 2

| Slack Wax Properties | |
|---|---|
| API | 39 |
| Hydrogen, wt. pct. | 15.14 |
| Sulfur, wt. pct. | 0.18 |
| Nitrogen, ppmw | 11 |
| Melting point, °C. (°F.) | 57 (135) |
| KV at 100° C., cSt | 5.168 |
| PNA, wt pct: | |
| Paraffins | 70.3 |
| Naphthenes | 13.6 |
| Aromatics | 16.3 |

| Simulated Distillation: | | |
|---|---|---|
| % | °C. | (°F.) |
| 5 | 375 | (710) |
| 10 | 413 | (775) |
| 30 | 440 | (825) |
| 50 | 460 | (860) |
| 70 | 482 | (900) |
| 90 | 500 | (932) |
| 95 | 507 | (945) |

Another slack wax suitable for use in the present process has the properties set out in Table 3 below. This wax is prepared by the solvent dewaxing of a 450 SUS (100 cS) neutral raffinate:

TABLE 3

| Slack Wax Properties | |
|---|---|
| Boiling range, °F. (°C.) | 708-1053 (375-567) |
| API | 35.2 |
| Nitrogen, basic, ppmw | 23 |
| Nitrogen, total, ppmw | 28 |
| Sulfur, wt. pct. | 0.115 |
| Hydrogen, wt. pct. | 14.04 |
| Pour point, °F. (°C.) | 120 (50) |
| KV (100° C.) | 7.025 |
| KV (300° F., 150° C.) | 3.227 |
| Oil (D 3235) | 35 |
| Molecular wt. | 539 |
| P/N/A: | |
| Paraffins | — |
| Naphthenes | — |
| Aromatics | 10 |

The wax feed may be hydrotreated before the hydrocracking/hydroisomerization step in order to remove heteroatom containing impurities and to hydrogenate at least some of the aromatics which may be present to form naphthenes. For de-oiled waxes, however, this pre-treatment will not normally be necessary since the removal of the occluded oil will remove many of the deleterious materials in the foots oil. Inorganic nitrogen and sulfur formed during the hydrotreating may be removed by a conventional separation. Conventional hydrotreating catalysts and conditions are suitably used. Catalysts typically comprise a base metal hydrogenation component such as nickel, tungsten, cobalt, nickel-tungsten, nickel-molybdenum or cobalt-molybdenum, on an inorganic oxide support of low acidity such as silica, alumina or silica-alumina, generally of a large pore, amorphous character. Typical hydrotreating conditions use moderate temperatures and pressures, e.g. 290°-425° C. (about 550°-800° F.), typically 345°-400° C. (about 650°-750° F), up to 20,000 kPa (about 3000 psig), typically about 4250-14000 kPa (about 600-2000 psig) hydrogen pressure, space velocity of about 0.3-2.0, typically 1 LHSV, with hydrogen circulation rates typically about 600-1800 n.l.l.$^{-1}$ (about 3,370 to 10,100 SCF/Bbl) usually about 1,300 n.l.l.$^{-1}$(about 7,300 SCF/Bbl). The severity of the hydrotreating step should be selected according to the characteristics of the feed; the objectives being to reduce residual aromatic content by saturation to form naphthenes so as to make initial improvements in lube quality by removal of aromatics and formation of naphthenes, as well as to remove heteroatom-containing impurities, especially sulfur, in order to improve the color and oxidative stability of the final lube products. The hydrotreating severity will therefore usually be greater with residual lube stocks such as bright stock because of their relatively high aromatic and sulfur contents.

Hydrocracking/Hydroisomerization Process Conditions

The wax feed is heated to an elevated temperature and is then passed over the hydrocracking/hydroisomerization catalyst in the presence of hydrogen. The objective of the process is primarily to saturate any aromatics which may be present and to carry out hydrocracking of the oil and waxes, with isomerization of the waxes to lower pour point iso-paraffins. The large pore structure of the present crystalline catalysts is well adapted to these ends because it permits ready access to the metal sites where hydrogenation takes place and also permits high metals loading on the support which favors the hydrogenation reactions. Because the thermodynamics of hydrocracking become unfavorable at temperatures above about 450° C. (about 850° F.) temperatures above this value will not normally be used. The exact temperature chosen will depend on the activity of the catalyst selected and on the feed and product qualities which, in turn, set the appropriate conversion. Thus, the temperature should be selected empirically after consideration of the relevant factors. The hydrotreating and hydrocracking reactions are net exothermic and for this reason, the feedstock need not be heated to the temperature desired in the catalyst bed which is normally in the range 290°, usually 360° C., to 440° C. (about 550°, usually, 675° F. to 825° F.). In many cases, temperatures from about 700° to 750° F. (about 370° to 400° C.) will be suitable for most wax feeds. At the beginning of the process cycle, the temperature employed will be at the lower end of this range but as the catalyst ages, the temperature may be increased in order to maintain the desired degree of activity.

The feed is passed over the catalysts in the presence of hydrogen. The space velocity of the feed is usually in the range 0.2 to 10 LHSV, preferably 1 to 2.0 LHSV and the hydrogen circulation rate from 250 to 1,500 n.l.l.$^{-1}$. (about 1400 to 8,427 SCF/bbl) and more usually from 300 to 900 n.l.l.$^{-1}$ (about 1685 to 5050 SCF/bbl). Hydrogen partial pressure is usually at least 75 percent of the total system pressure with reactor inlet pressures normally being in the range of 3000 to 30,000 kPa (about 420 to about 4,335 psig). High pressure operation is normally preferred in order to saturate aromatics and to facilitate the formation of the more desirable naphthenes and paraffins. Pressures will therefore usually be at least about 1,000 psig (7,000 kPa Abs) up to about 3,000 psig (about 20,000 kPa), usually from about 1435 psig (10,000 kPa) to about 2600 psig (about 18,000 kPa abs). Conversion to products boiling outside the lube range, typically to 345° C.—(about 650° F.—) products, is normally at least about 15 percent, and usually from about 25 to 60, usually 25 to 35, percent for dewaxed products with a target VI of 135 or higher. Boiling point conversion (for 650° F.—) is defined as:

$$650° \text{F.} - \text{conversion} = \frac{650° \text{F.} + \text{in Feed} - 650° \text{F.} + \text{in Product}}{650° \text{F.} + \text{in Feed}}$$

The wax conversion will be from about 10 to about 90 percent but is preferably in the range of 50 to 70 weight percent for products with a VI of at least 135 and usually at leat about 140. Wax conversion is defined as:

$$\text{Wax Conversion} = \frac{\text{Wt \% Wax in Feed} - (\text{Wt \% Unconverted Wax after Solvent Dewaxing})}{\text{Wt \% Wax in Feed}}$$

DEWAXING

The hydrocracked/hydroisomerized product may be dewaxed if necessary to target pour point after the HDC/HDI step. Either catalytic dewaxing or solvent dewaxing may be used at this point and if a solvent dewaxer is used, the removed wax may be recycled to for further treatment.

The preferred catalytic dewaxing processes utilize an intermediate pore size zeolite such as ZSM-5, but the most preferred dewaxing catalysts are based on the highly constrained intermediate pore size zeolites such as ZSM-22, ZSM-23 or ZSM-35, since these zeolites have been found to provide highly selective dewaxing, giving dewaxed products of low pour point and high VI. Dewaxing processes using these zeolites are described in U.S. Pat. Nos. 4,222,855. The zeolites whose use is preferred here may be characterized in the same way as described in U.S. Pat. No. 4,222,855, i.e. as zeolites having pore openings which result in the the possession of defined sorption properties set out in the patent, namely, (1) a ratio of sorption of n-hexane to o-xylene, on a volume percent basis, of greater than about 3, which sorption is determined at a $P/P_0$ of 0.1 and at a temperature of 50° C. for n-hexane and 80° C. for o-xylene and (2) by the ability of selectively cracking 3-methylpentane (3MP) in preference to the doubly branched 2,3-dimethylbutane (DMB) at 1000° F. and atmosphere pressure from a 1/1/1 weight ratio mixture of n-hexane/3-methyl-pentane/2,3-dimethylbutane, with the ratio of rate constants determined at a temperature of 1000° F. being in excess of about 2. The expression, "$P/P_0$", is accorded its usual significance as described in the literature, for example, in "The Dynamical Character of Adsorption" by J.H. deBoer, 2nd Edition, Oxford University Press (1968) and is the relative pressure defined as the ratio of the partial pressure of sorbate to the vapor pressure of sorbate at the temperature of sorption. The ratio of the rate constants, $k_{3MP}/k_{DMB}$, is determined from 1st order kinetics, in the usual manner, by the following equation:

$$k=(1/T_c)ln(1/1-\epsilon)$$

where k is the rate constant for each component, $T_c$ is the contact time and $\epsilon$ is the fractional conversion of each component.

Zeolites conforming to these sorption requirements include the naturally occurring zeolite ferrierite as well as the known synthetic zeolites ZSM-22, ZSM-23 and ZSM-35. These zeolites are at least partly in the acid or hydrogen form when they are used in the dewaxing process and a metal hydrogenation component, preferably a noble metal such as platinum is preferable used. Excellent results have been obtained with a Pt/ZSM-23 dewaxing catalyst.

CATALYST METAL COMPONENT

The hydrocracking/hydroisomerization catalyst is a bifunctional catalyst which comprises a mesoporous crystalline material as described below as the component which acts as a support and in addition, provides the desired acidic functionality for the hydrocracking reactions, together with a hydrogenation-dehydrogenation component. The hydrogenation-dehydrogenation component is provided by a metal or combination of metals. Noble metals of Group VIIIA, especially platinum and palladium, may be used where the level of sulfur and other contaminants in the feed to the HDC/HDI step permits or, alternatively, base metals may be used. Base metals of Groups IVA, VIA and VIIIA, especially chromium, molybdenum, tungsten, cobalt and nickel, may be used. Base metal combinations, especially a combination of a Group VIIIA metal with a Group IVA or VIA metal are highly preferred, such as nickel-molybdenum, cobalt-nickel, nickel-tungsten, cobalt-nickel-molybdenum and nickel-tungsten-titanium are useful.

The content of the metal component will vary according to its catalytic activity. Thus, the highly active noble metals may be used in smaller amounts than the less active base metals. For example, about 1 wt. percent or less platinum will be effective and in a preferred base metal combination, about 7 wt. percent nickel and about 2.1 to about 40 wt. percent tungsten, expressed as metal. The present support materials are, however, notable in that they are capable of including a greater proportion of metal than previous support materials because of their extraordinarily large surface area. The metal component may exceed about 25 percent and still maintain a high surface area above 200 m² g⁻¹. The hydrogenation component can be exchanged onto the support material, impregnated into it or physically admixed with it. If the metal is to be impregnated into or exchanged onto the mesoporous support, it may be done, for example, by treating the zeolite with a platinum metal-containing ion. Suitable platinum compounds include chloroplatinic acid, platinous chloride and various compounds containing the platinum ammine complex. The metal compounds may be either compounds in which the metal is present in the cation of the compound and compounds in which it is present in the anion of the compound. Both types of compounds can be used. Platinum compounds in which the metal is in the form of a cation of cationic complex, e.g., $Pt(NH_3)_4Cl_2$ are particularly useful, as are anionic complexes such as the vanadate and metatungstate ions. Cationic forms of other metals are also very useful since they may be exchanged onto the crystalline material or impregnated into it.

Mesoporous catalysts similar to those disclosed here are described also in the following co-pending applications: Application Ser. No. 07/734,971, filed concurrently discloses mesoporous lube hydrocracking catalysts); Ser. No. 07/734,826, filed concurrently discloses mesoporous catalysts used for wax hydrocracking/hydroisomerization) and Ser. No. 07/734,987. filed concurrently, which discloses high metal content catalysts which are especially useful in processes such as the present one where the objective is to achieve a high degree of saturation in the feed. Reference is made to these applications, especially Ser. No. 07/734,987 for a more extended description of such catalysts.

MESOPOROUS CRYSTALLINE COMPONENT

The acidic component of the hydrocracking/hydroisomerization catalyst is a mesoporous crystalline material which is described in detail below. When it is used in the present catalysts, the mesoporus crystalline material is at least partly in the decationized or hydrogen form in order to provide the desired acidic functionality for the reactions which are to take place.

The mesoporous catalytic material is an inorganic, porous, non-layered crystalline phase material which can be characterized (in its calcined form) by an X-ray diffraction pattern with at least one peak at a d-spacing breater than about 18 Å with a relative intensity of 100 and a benzene sorption capacity of greater than 15 grams of benzene per 100 grams of the the material at 50 torr and 25° C. The X-ray pattern should be determined with the metal-free material since the presence of the metal component, particularly at high metal loadings, may obscure the X-ray pattern.

The preferred form of the crystalline material has a hexagonal arrangement of uniformly-sized pores with a maximum perpendicular cross-section pore dimension of at least about 13 Å (Å), and typically within the range of from about 13 Å to about 200 Å. A preferred form of this hexagonal crystalline composition, identified as MCM-41, exhibits a hexagonal electron diffraction pattern that can be indexed with a $d_{100}$ value greater than about 18 Å, and a benzene adsorption capacity of greater than about 15 grams benzene/100 grams crystal at 50 torr and 25° C. This material is described in detail in Ser. No. 07/625,245 and below.

The inorganic, non-layered mesoporous crystalline material used as a component of the catalyst has the following composition:

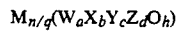

wherein W is a divalent element as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and $(a+b+c+d)=1$.

A preferred embodiment of the above crystalline material is when $(a+b+c)$ is greater than d, and $h=2$. A further embodiment is when a and $d=0$, and $h=2$. The preferred materials for use in making the present hydrocracking catalysts are the aluminosilicates.

In the as-synthesized form, the catalytic material has a composition, on an anhydrous basis, expressed empirically as follows:

$$rRM_{n/q}(W_aX_bY_cZ_dO_h)$$

where R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods described below.

To the extent desired, the original M, e.g. sodium or chloride, ions of the as-synthesized material of this invention can be replaced in accordance with conventional ion-exchange techniques. Preferred replacing ions include metal ions, hydrogen ions, hydrogen precursor, e.g. ammonium, ions and mixtures of these ions. Particularly preferred ions are those which provide the desired metal functionality in the final hydrocracking catalyst. These include hydrogen, rare earth metals and metals of Groups VIIA (e.g. Mn), VIIIA (e.g. Ni),IB (e.g. Cu), IVB (e.g. Sn) of the Periodic Table of the Elements and mixtures of these ions.

The crystalline (i.e. having sufficient order to provide a diffraction pattern such as, for example, by X-ray, electron or neutron diffraction, following calcination with at least one peak) mesoporous material may be characterized by its structure, which includes extremely large pore windows as well as by its high sorption capacity. The term "mesoporous" is used here to indicate crystals having uniform pores within the range of from about 13 Å to about 200 Å. The mesoporous materials have uniform pores within the range of from about 13 Å to about 200 Å, more usually from about 15 Å to about 100 Å. Since these pores are significantly larger than those of other crystalline materials, it is appropriate to refer to them as ultra-large pore size materials. For the purposes of this application, a working definition of "porous" is a material that adsorbs at least 1 gram of a small molecule, such as Ar, $N_2$, n-hexane or cyclohexane, per 100 grams of the solid.

The catalytic material can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The preferred materials have a hexagonal arrangement of large open channels that can be synthesized with open internal diameters from about 13 Å to about 200 Å. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the material of the present invention give an X-ray diffraction pattern with a few distinct maxima in the extreme low angle region. The positions of these peaks approximately fit the positions of the hkO reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hkO projection of the hexagonal lattice and is related to the repeat distance $a_0$ between channels observed in the electron micrographs through the formula $d_{100}=a_0\sqrt{3}/2$. This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hkO subset of unique reflections of 100, 110, 200, 210, etc., and their symmetry-related reflections.

In its calcined form, the crystalline material may be further characterized by an X-ray diffraction pattern with at least one peak at a position greater than about 18 Angstrom Units d-spacing (4.909°2θ for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal.

More particularly, the calcined crystalline non-layered material may be characterized by an X-ray diffraction pattern with at least two peaks at positions greater than about 10 Angstrom Units d-spacing (8.842°$\theta$ for Cu K-alpha radiation), at least one of which is at a position greater than about 18 Angstrom Units d-spacing, and no peaks at positions less than about 10 Å d-spacing with relative intensity greater than about 20% of the strongest peak. Still more particularly, the X-ray diffraction pattern of the calcined material of this invention will have no peaks at positions less than about 10 Å d-spacing with relative intensity greater than about 10% of the strongest peak. In any event, at least one peak in the X-ray diffraction pattern will have a d-spacing that corresponds to the $d_{100}$ value of the electron diffraction pattern of the material.

The calcined inorganic, non-layered crystalline material may also be characterized as having a pore size of about 13 Å or greater as measured by physisorption measurements, described below. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of $2\theta$, where $\theta$ is the Bragg angle, and a counting time of 10 seconds for each step. The interplanar spacings, d's, were calculated in Å (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75'100), s=strong (50-74), m=medium (25-49) and w=weak (0-24). The diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as described below.

The ammonium form of the catalytic material may be readily converted to the hydrogen form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material can be prepared by one of several methods, each with particular limitations.

A first method involves a reaction mixture having an $X_2O_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, described below. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, described below, and a solvent or solvent mixture, such as, for example, $C_1$–$C_6$ alcohols, $C_1$–$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | where e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the desired crystalline material.

A second method for synthesis of the crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, described below. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each described below, and a solvent or solvent mixture, such as, for example, $C_1$-$C_6$ alcohols, $C_1$-$C_6$ diols and/or water, especially water. The reaction mixture has a composition, in terms of mole ratios of oxides, within the following ranges:

| Reactants | Useful | Preferred |
|---|---|---|
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/ $(YO_2 + WO + Z_2O_5 + X_2O_3)$ | 1 to 1500 | 5 to 1000 |
| | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | where e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the precise value of the pH is not important for crystallization.

A third method for synthesis of the crystalline material is where X comprises aluminum and Y comprises silicon, the crystallization temperature must be from about 25° C. to about 175° C., preferably from about 50° C. to about 150.C, and an organic directing agent, described below, or, preferably a combination of that organic directing agent plus an additional organic agent, described below, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$-$C_6$ alcohols, $C_1$-$C_6$ diols and/or water, especially water. The reaction mixture has a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | where e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. The crystals are then separated from the liquid and recovered. Following the synthesis, the crystalline material should be subjected to treatment to remove part or all of any organic constituent.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, various embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

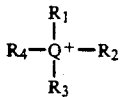

where Q is nitrogen or phosphorus and wherein at least one of $R_1$, $R_2$, $R_3$ and $R_4$ is aryl or alkyl of from 6 to about 36 carbon atoms, e.g. $-C_6H_{13}$, $-C_{10}H_{21}$, $-C_{16}H_{33}$ and $-C_{18}H_{37}$, or combinations thereof, the remainder of $R_1$, $R_2$, $R_3$ and $R_4$ being selected from hydrogen, alkyl of from 1 to 5 carbon atoms and combinations of these. The compound from which the above ammonium or phosphonium ion is derived may be, for example, the hydroxide, halide, silicate, or mixtures of these.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, benzyltrimethylammonium, cetylpyridinium, myristyltrimethylammonium, decyltrimethylammonium, dodecyltrimethylammonium and dimethyldidodecylammonium.

The reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the synthesis procedure can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The size of the pores in the present mesoporous catalytic materials is large enough that the spatiospecific selectivity with respect to transition state species in reactions such as cracking is minimized (Chen et al., "Shape Selective Catalysis in Industrial Applications", 36 CHEMICAL INDUSTRIES, pgs. 41–61 (1989) to which reference is made for a discussion of the factors affecting shape selectivity). Diffusional limitations are also minimized as a result of the very large pores. For these reasons, the present compositions are especially useful for catalyzing the hydrocarcking reqctions with high boiling feeds containing components with bulky molecular conficurations.

It is normally preferred to use the crystalline material in a form which has sufficient acidic functionality to give it an alpha value of 1 or more. The alpha test is described in U.S. Pat. No. 3,354,078 and in *J. Catalysis*, 527 (1965); 6, 278 (1966); and 61, 395 (1980), to which reference is made for a description of the test. The experimental conditions of the test used to determine the alpha values referred to in this specification include a constant temperature of 538° C. and a variable flow rate as described in detail in *J. Catalysis*, 61. 395 (1980). The acidic functionality may be controlled by base exchange, especially with alkali metal cations such as sodium, by steaming or by control of the silica:alumina ratio of the material.

It may be desirable to incorporate the catalyst in another material resistant to the temperature and other conditions employed in the process. Such matrix materials include synthetic and naturally occurring substances such as inorganic materials, e.g. clay, silica and metal oxides. Matrix materials may themselves possess catalytic properties, generally of an acidic nature.

The catalyst may be treated by conventional pre-sulfiding treatments, e.g. by heating in the presence of hydrogen sulfide, to convert oxide forms of the metals such as CoO or NiO to their corresponding sulfides.

Examples 1 to 19 below illustrate the preparation of the mesoporous crystalline materials used to prepare the catalysts. In these examples, the sorption data for water, cyclohexane, benzene and/or n-hexane, they are Equilibrium Adsorption values determined as follows:

A weighed sample of the adsorbent, after calcination at about 540° C. for at least about 1 hour and other treatment, if necessary, to remove any pore blocking contaminants, is contacted with the desired pure adsorbate vapor in an adsorption chamber. The increase in weight of the adsorbent is calculated as the adsorption capacity of the sample in terms of grams/100 grams adsorbent based on adsorbent weight after calcination at about 540° C. The present composition exhibits an equilibrium benzene adsorption capacity at 50 Torr and 25° C. of greater than about 15 grams/100 grams, particularly greater than about 17.5 g/100 g/ and more particularly greater than about 20 g/100 g.

A preferred way to do this is to contact the desired pure adsorbate vapor in an adsorption chamber evacuated to less than 1 mm at conditions of 12 Torr of water vapor, 40 Torr of n-hexane or cyclohexane vapor, or 50 Torr of benzene vapor, at 25° C. The pressure is kept constant (within about ±0.5 mm) by addition of adsorbate vapor controlled by a manostat during the adsorption period. As adsorbate is adsorbed by the new crystal, the decrease in pressure causes the manostat to open a valve which admits more adsorbate vapor to the chamber to restore the above control pressures. Sorption is complete when the pressure change is not sufficient to activate the manostat.

Another way of doing this for benzene adsorption data is on a suitable thermogravimetric analysis system, such as a computer-controlled 990/951 duPont TGA system. The adsorbent sample is dehydrated (physically sorbed water removed) by heating at, for example, about 350° C. or 500° C. to constant weight in flowing helium. If the sample is in as-synthesized form, e.g. containing organic directing agents, it is calcined at about 540° C. in air and held to constant weight instead of the previously described 350° C. or 500° C. treatment. Benzene adsorption isotherms are measured at 25° C. by blending a benzene saturated helium gas stream with a pure helium gas stream in the proper proportions to obtain the desired benzene partial pressure. The value of the adsorption at 50 Torr of benzene is taken from a plot of the adsorption isotherm. In the examples, percentages are by weight unless otherwise indicated.

EXAMPLE 1

One hundred grams of cetyltrimethylammonium (CTMA) hydroxide solution, prepared by contacting a 29 wt. % N,N,N- trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

2.7 moles $Na_2O$
392 moles $SiO_2$
35.7 moles $(CTMA)_2O$
61.7 moles $(TMA)_2O$
6231 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The product of this example may be characterized by X-ray diffractiion as including a very strong relative intensity line at 37.8±2.0 Å d-spacing, and weak lines at 21.6±1.0 and 19.2±1.0 Å. Transmission electron microscopy (TEM) produced images of a hexagonal arrangement of uniform pores and hexagonal electron diffraction pattern with a $d_{100}$ value of about 30 Å.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

2.7 moles $Na_2O$
291 moles $SiO_2$
35.7 moles $(CTMA)_2O$
102 moles $(TMA)_2O$
6120 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 993 $m^2/g$ and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

The X-ray diffraction pattern of the calcined product may be characterized as including a very strong relative intensity line at 39.3±2.0 Å d-spacing, and weak lines at 22.2±1.0 and 19.4±1.0 Å. TEM indicated that the product contained the ultra-large pore material.

A portion of the above product was then contacted with 100% steam at 1450° F. for two hours. The surface area of the steamed material was measured to be 440

$m^2/g$, indicating that about 45% was retained following severe steaming.

Another portion of the calcined product of this example was contacted with 100% steam at 1250° F. for two hours. The surface area of this material was measured to be 718 $m^2/g$, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

0.65 moles $Na_2O$
65 moles $SiO_2$
8.8 moles $(CTMA)_2O$
1.22 moles $(TPA)_2O$
1336 moles $H_2O$ The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

0.65 moles $Na_2O$
65 moles $SiO_2$
15 moles $(CTMA)_2O$
1.22 moles $(TPA)_2O$
35.6 moles $(TMA)_2O$
2927 moles $H_2O$ 7 The resulting solid product was recovered by filtration and dried in air at ambient temperature. The product was then calcined at 540° C. for 1 hour in nitrogen, followed by 6 hours in air.

The calcined product proved to have a surface area of 1085 $m^2/g$ and the following equilibrium adsorption capacities in grams/100 grams:

| $H_2O$ | 11.5 |
|---|---|
| Cyclohexane | >50 |
| n-Hexane | 39.8 |
| Benzene | 62 |

The X-ray diffraction pattern of the calcined product of this example may be characterized as including a very strong relative intensity line at 38.2±2.0 Å d-spacing, and weak lines at 22.2±1.0 and 19.4±1.0 Å. TEM indicated the product contained the ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

0.23 moles $Na_2O$
33.2 moles $SiO_2$
6.1 moles $(CTMA)_2O$
5.2 moles $(TMA)_2O$
780 moles $H_2O$ The resulting solid product was recovered by filtration and dried in air at ambient temperature. The product was then calcined at 540° C. for 1 hour in nitrogen, followed by 6 hours in air.

The calcined product proved to have a surface area of 1043 $m^2/g$ and the following equilibrium adsorption capacities in grams/100 grams:

| $H_2O$ | 6.3 |
|---|---|
| Cyclohexane | >50 |
| n-Hexane | 49.1 |
| Benzene | 66.7 |

The X-ray diffraction pattern of the calcined product may be characterized as including a very strong relative intensity line at 40.8±2.0 Å d-spacing, and weak lines at 23.1±1.0 and 20.1±1.0 Å. TEM indicated that the product contained the ultra-large pore material.

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:

1.0 moles $P_2O_5$
0.51 moles $(Pyr)_2O$
47.2 moles $H_2O$

The resulting solid product was recovered by filtration and dried in air at ambient temperature. The product was then calcined at 540° C. for 1 hour in nitrogen, followed by 6 hours in air.

The calcined product proved to have a surface area of 707 $m^2/g$ and the following equilibrium adsorption capacities in grams/100 grams:

| $H_2O$ | 33.2 |
|---|---|
| Cyclohexane | 19.7 |
| n-Hexane | 20.1 |
| Benzene | 23.3 |

The X-ray diffraction pattern of the calcined product may be characterized as including a very strong relative intensity line at 25.4±1.5 Å d-spacing. TEM indicated the product contained the present ultra-large pore material.

EXAMPLE 6

A solution of 1.35 grams of $NaAlO_2$ (43.5% 30% $Na_2O$) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

0.25 moles $Al_2O_3$
10 moles $Na_2O$
36 moles $SiO_2$
0.95 moles $(CTMA)_2O$
2.5 moles $(TEA)_2O$
445 moles $H_2O$ The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % $SiO_2$ and 5.1 wt. % $Al_2O_3$, and proved to have a benzene equilibrium adsorption capacity of 58.6 grams/100 grams.

The X-ray diffraction pattern of the calcined product may be characterized as including a very strong relative intensity line at $31.4 \pm 1.5$ Å d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole $SiO_2$:

0.5 mole $(CTMA)_2O$
46.5 moles $H_2O$

The resulting solid product was recovered by filtration, washed with water, then calcined at 540° C. for 1 hour in nitrogen, followed by 10 hours in air.

The calcined product composition included less than 0.01 wt. % Na, about 98.7 wt. % $SiO_2$ and about 0.01 wt. % $Al_2O_3$, and proved to have a surface area of 896 m²/g. The calcined product had the following equilibrium adsorption capacities in grams/100 grams:

| | |
|---|---|
| $H_2O$ | 8.4 |
| Cyclohexane | 49.8 |
| n-Hexane | 42.3 |
| Benzene | 55.7 |

The X-ray diffraction pattern of the calcined product of this example may be characterized as including a very strong relative intensity line at $40.0 \pm 2.0$ Å d-spacing and a weak line at $21.2 \pm 1.0$ Å. TEM indicated that the product of this example contained at least three separate phases, one of which was the ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole $SiO_2$:

0.5 mole $(CTMA)_2O$
46.5 moles $H_2O$

The resulting solid product was recovered by filtration, washed with water, then calcined at 540° C. for 6 hours in air.

The calcined product composition was measured to include 0.01 wt. % Na, 93.2 wt. % $SiO_2$ and 0.016 wt. % $Al_2O_3$, and proved to have a surface area of 992 m²/g and the following equilibrium adsorption capacities in grams/100 grams:

| | |
|---|---|
| $H_2O$ | 4.6 |
| Cyclohexane | >50 |
| n-Hexane | >50 |
| Benzene | 62.7 |

The X-ray diffraction pattern of the calcined product may be characterized as including a very strong relative intensity line at $43.6 \pm 2.0$ Å d-spacing and weak lines at $25.1 \pm 1.5$ and $21.7 \pm 1.0$ Å. TEM indicated that the product contained the ultra-large pore material.

EXAMPLE 9

Sodium aluminate (4.15 g) was added slowly into a solution containing 16 g of myristyltrimethylammonium bromide ($C_{14}TMABr$) in 100 g of water. Tetramethylammonium silicate (100 g-10% $SiO_2$), HiSil (25 g) and tetramethylammonium hydroxide (14.2 g-25% solution) were then added to the mixture. The mixture was crystallized in an autoclave at 120° C. with stirring for 24 hours.

The product was filtered, washed and air dried. Elemental analysis showed the product contained 53.3 wt % $SiO_2$, 3.2 wt % $Al_2O_3$, 15.0 wt % C, 1.88 wt % N, 0.11 wt % Na and 53.5 wt % ash at 1000° C. The X-ray diffraction pattern of the material after calcination at 540° C. for 1 hour in $N_2$ and 6 hours in air includes a very strong relative intensity line at $35.3 \pm 2.0$ Å d-spacing and weak lines at $20.4 \pm 1.0$ and $17.7 \pm 1.0$ Å d-spacing. TEM indicated that the product contained the ultra-large pore material.

The washed product, having been exchanged with 1N ammonium nitrate solution at room temperature, then calcined, proved to have a surface area of 827 m²/g and the following equilibrium adsorption capacities in g/100 g anhydrous sorbent:

| | |
|---|---|
| $H_2O$ | 30.8 |
| Cyclohexane | 33.0 |
| n-Hexane | 27.9 |
| Benzene | 40.7 |

EXAMPLE 10

Sodium aluminate (8.3 g) was added slowly into a solution containing 184 g of dodecyltrimethylammonium hydroxide ($C_{12}TMAOH$, 50%) solution diluted with 480 g of water. UltraSil (50 g) and an aqueous solution of tetramethylammonium silicate (200g-10% $SiO_2$) and tetramethylammonium hydroxide (26.38 g-25% solution) were then added to the mixture. The mixture was crystallized in an autoclave at 100° C. with stirring for 24 hours.

The product was filtered, washed and air dried. After calcination at 540° C. for 1 hour in $N_2$ and 6 hours in air, the X-ray diffraction pattern includes a very strong relative intensity line at 30.4±1.5 Å d-spacing and weak lines at 17.7±1.0 and 15.3±1.0 Å d-spacing. TEM indicated that the product contained the ultra-large pore material.

The washed product, having been exchanged with 1N ammonium nitrate solution at room temperature, then calcined, proved to have a surface area of 1078 $m^2/g$ and the following equilibrium adsorption capacities in g/100 g anhydrous sorbent:

|  |  |
|---|---|
| $H_2O$ | 32.6 |
| Cyclohexane | 38.1 |
| n-Hexane | 33.3 |
| Benzene | 42.9 |

EXAMPLE 11

A solution of 4.9 grams of $NaAlO_2$ (43.5 % $Al_2O_3$, 30% $NaO_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole $Al_2O_3$:

1.1 moles $Na_2O$
30.6 moles $SiO_2$
3.0 moles $(TEA)_2O$
3 25 moles $(CTMA)_2O$
609 moles $H_2O$ The resulting solid product was recovered by filtration, washed with water then calcined at 540° C. for 16 hours in air. The calcined product proved to have a surface area of 1352 $m^2/g$ and the following equilibrium adsorption capacities in grams/100 grams:

|  |  |
|---|---|
| $H_2O$ | 23.6 |
| Cyclohexane | >50 |
| n-Hexane | 49 |
| Benzene | 67.5 |

The X-ray diffraction pattern of the calcined product may be characterized as including a very strong relative intensity line at 38.5±2.0 Å d-spacing and a weak line at 20.3±1.0 Å. TEM indicated that the product contained the ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole $Al_2O_3$:

1.25 moles $Na_2O$
27.8 moles $SiO_2$
5.1 moles $(CTMA)_2O$
4.40 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. TEM indicated that this product contained the ultra-large pore material. The X-ray diffraction pattern of the calcined product of this example can be characterized as including a very strong relative intensity line at 44.2±2.0 Å d-spacing and weak lines at 25.2±1.5 and 22.0±1.0 Å.

The calcined product proved to have a surface area of 932 $m^2/g$ and the following equilibrium adsorption capacities in grams/100 grams:

|  |  |
|---|---|
| $H_2O$ | 39.3 |
| Cyclohexane | 46.6 |
| n-Hexane | 37.5 |
| Benzene | 50 |

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

1.25 moles $Na_2O$
27.8 moles $SiO_2$
5.1 moles $(CTMA)_2O$
4.4 moles $(TMA)_2O$
650 moles $H_2O$ The resulting solid product was recovered by filtration and dried in air at ambient temperature. The product was then calcined at 540° C. for 1 hour in nitrogen, followed by 6 hours in air. The calcined product proved to have the following equilibrium adsorption capacities in grams/100 grams:

|  |  |
|---|---|
| $H_2O$ | 35.2 |
| Cyclohexane | >50 |
| n-Hexane | 40.8 |
| Benzene | 53.5 |

The X-ray diffraction pattern of the calcined product may be characterized as including a very strong relative intensity line at 39.1±2.0 Å d-spacing and weak lines at 22.4±1.0 and 19.4±1.0 Å. TEM indicated that this product contained the ultra-large pore material.

EXAMPLE 14

A mixture of 125 grams of 29% CTMA chloride aqueous solution, 200 grams of water, 3 grams of sodium aluminate (in 50 grams $H_2O$), 65 grams of Ultrasil, amorphous precipitated silica available from PQ Corporation, and 21 grams NaOH (in 50 grams $H_2O$) was stirred thoroughly and crystallized at 150° C. for 168 hours. The reaction mixture had the following relative molar composition in terms of moles per mole silica:

0.10 moles $(CTMA)_2O$
21.89 moles $H_2O$
0.036 moles $NaAlO_2$
0.53 moles NaOH

The solid product was isolated by filtration, washed with water, dried for 16 hours at room temperature and calcined at 540° C. for 10 hours in air. The calcined product proved to have a surface area of 840 m²/g, and the following equilibrium adsorption capacities in grams/100 grams:

| | |
|---|---|
| $H_2O$ | 15.2 |
| Cyclohexane | 42.0 |
| n-Hexane | 26.5 |
| Benzene | 62 |

The X-ray diffraction pattern of the calcined product may be characterized as including a very strong relative intensity line at 40.5±2.0 Å d-spacing. TEM indicated that the product contained the ultra-large pore material.

EXAMPLE 15

To make the primary template mixture for this example, 240 grams of water was added to a 92 gram solution of 50% dodecyltrimethylammonium hydroxide, 36% isopropyl alcohol and 14% water such that the mole ratio of Solvent/$R_2/O$ was 155. The mole ratio of $H_2O/R_2/O$ in this mixture was 149 and the IPA/$R_2/O$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution. The mole ratio of $R_2/O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

0.05 mole $Na_2O$
0.036 mole $Al_2O_3$
0.18 mole $(C_{12}TMA)_2O$
0.12 mole $(TMA)_2O$
36.0 moles $H_2O$
1.0 mole IPA The resulting solid product was recovered by filtration, washed with water and dried in air at ambient temperature. The product was then calcined at 540° C. for 1 hour in nitrogen, followed by 6 hours in air.

The calcined product proved to have a surface area of 1223 m²/g and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

The X-ray diffraction pattern of the calcined product may be characterized as including a very strong relative intensity line at 30.8±1.5 Å d-spacing and weak lines at 17.9±1.0 and 15.5±1.0 Å. TEM indicated this product to contain the ultra-large pore material.

EXAMPLE 16

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

0.81 mole $(C_{10}TMA)_2O$
47.6 moles $H_2O$

The resulting solid product was filtered and washed several times with warm (60°-70° C.) distilled water and with acetone. The final product was calcined to 538° C. in $N_2$/air mixture and then held in air for about 8 hours. The calcined product proved to have a surface area of 915 m²/g and an equilibrium benzene adsorption capacity of 35 grams/100 grams. Argon physisorption data indicated an argon uptake of 0.34 cc/gram, and a pore size of 15 Å.

The X-ray diffraction pattern of the calcined product of this example may be characterized as including a very strong relative intensity line at 27.5±1.5 Å d-spacing and weak lines at 15.8±1.0 and 13.7±1.0 Å. TEM indicated that the product of this example contained the ultra-large pore material.

EXAMPLE 17

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm.

The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
80.53 moles 1,3,5-trimethylbenzene The resulting product was filtered and washed several times with warm (60°-70° C.) distilled water and with acetone. The final product was calcined to 538° C. in $N_2$/air mixture and then held in air for about 10 hours. The calcined product proved to have an equilibrium benzene adsorption capacity of >25 grams/100 grams.

The X-ray diffraction pattern of the calcined product may be characterized as including a broad, very strong relative intensity line at about 102 Å d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Å d-spacing and about 120 Å d-spacing.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
2256 moles $H_2O$
132.7 moles 1,3,5-trimethylbenzene The resulting product was filtered and washed several times with warm (60°-70° C.) distilled water and with acetone. The final product was calcined to 538° C. in $N_2$/air mixture and then held in air for about 10 hours. The calcined product proved to have a surface area of 915 m$^2$/g and an equilbrium benzene adsorption capacity of >25 grams/100 grams. Argon physisorption data indicated an argon uptake of 0.95 cc/gram, and a pore size centered on 78 Å (Dollimore-Heal Method, see Example 22(b)), but running from 70 to greater than 105 Angstoms. The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product contained several materials with different $d_{100}$ values as observed in their electron diffraction patterns. These materials were found to possess $d_{100}$ values between about 85 Å d-spacing and about 110 Å d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

1.25 moles $Na_2O$
27.8 moles $SiO_2$
5.1 moles $(CTMA)_2O$
2.24 moles $(TMA)_2O$
650 moles $H_2O$
19.9 moles 1,3,5-trimethylbenzene The resulting product was filtered and washed several times with warm (60°-70° C.) distilled water and with acetone. The final product was calcined to 538° C. in $N_2$/air mixture and then held in air for about 8 hours.

The calcined product proved to have a surface area of 975 m$^2$/g and an equilbrium benzene adsorption capacity of >40 grams/100 grams. Argon physisorption data indicated an argon uptake of 0.97 cc/gram, and a pore size of 63 Å (Dollimore-Heal Method), with the peak occurring at $P/P_o$=0.65.

The X-ray diffraction pattern of the calcined product of this example may be characterized as including a very strong relative intensity line at 63±5 Å d-spacing and weak lines at 36.4±2.0, 31.3±1.5 Å and 23.8±1.0 Å d-spacing. TEM indicated that the product of this example contained the ultra-large pore material.

EXAMPLE 20

Argon Physisorption Determination

To determine the pore diameters of the mesoporous products with pores up to about 60 Å in diameter, 0.2 gram samples of the products of Examples 1 through 17 were placed in glass sample tubes and attached to a physisorption apparatus as described in U.S. Pat. No. 4,762,010.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., *Adsorption, Surface Area and Porosity*, 2nd ed., Academic Press, 1982). In each instance, a graph of the amount adsorbed versus the relative pressure above the sample, at equilibrium, constitutes the adsorption isotherm. It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. The adsorption peak (stated in terms of log $(P/P_o)$) may be related to the physical pore diameter (Å) by the following formula:

$$\log(P/P_o) = \frac{K}{d - 0.38}\left[\frac{S^4}{3(L - D/2)^3} - \frac{S^{10}}{9(L - D/2)^9} - \right.$$

-continued $$\left. \frac{S^4}{3(D/2)^3} + \frac{S^{10}}{9(D/2)^9} \right]$$

where d=pore diameter in nanometers, K=32.17, S=0.2446, L=d+0.19, and D=0.57.

This formula is derived from the method of Horvath and Kawazoe (G. Horvath et al., *J. Chem. Eng. Japan*, 16 (6) 470(1983)). The constants required for the implementation of this formula were determined from a measured isotherm of ALPO-5 and its known pore size. This method is particularly useful for microporous materials having pores of up to about 60 Å in diameter.

The results of this procedure for the samples from Examples 1 through 16 are tabulated below. The samples from Examples 10, 13 and 15 gave two separate peaks, believed to be the result of two separate ultra-large pore phases in the products.

| Examples | Pore Diameter, Å |
|---|---|
| 1 | 32.2 |
| 2 | 35.4 |
| 3 | 42.5 |
| 4 | 39.6 |
| 5 | 16.9 |
| 6 | 27.3 |
| 7 | 36.6 |
| 8 | 42.6 |
| 9 | 28.3 |
| 10 | 22.8, 30.8 |
| 11 | 36.8 |
| 12 | 36.1 |
| 13 | 35.0, 42.1 |
| 14 | 40.0 |
| 15 | 22.4, 30.4 |
| 16 | 15.0 |

By way of comparison, a commercially prepared sample of zeolite USY (equilibrium benzene sorption capacity of 20.7 grams/100 grams, X-ray diffraction pattern with all the lines of zeolite Y and with the highest d-spacing at about 14 Å) had a pore diameter of about 8.3 Å as determined by the above method.

The method of Horvath and Kawazoe for determining pore size from physisorption isotherms was intended to be applied to pore systems of up to 20 Å diameter; but with some care as above detailed, its use can be extended to pores of up to 60 Å diameter.

In the pore regime above 60 Å diameter, the Kelvin equation can be applied. It is usually given as:

$$\ln(P/P_o) = \frac{-2\gamma V}{r_k RT} \cos\theta$$

where:
$\gamma$ = surface tension of sorbate
V = molar volume of sorbate
$\theta$ = contact angle (usually taken for practical reasons to be 0)
R = gas constant
T = absolute temperature
$r_k$ = capillary condensate (pore) radius
$P/P_o$ = relative pressure (taken from the physisorption isotherm)

The Kelvin equation treats adsorption in pore systems as a capillary condensation phenomenon and relates the pressure at which adsorption takes place to the pore diameter through the surface tension and contact angle of the adsorbate (in this case, argon). The principles upon which the Kelvin equation are based are valid for pores in the size range 50 to 1000 Angstrom diameter. Below this range the equation no longer reflects physical reality, since true capillary condensation cannot occur in smaller pores; above this range the logarithmic nature of the equation precludes obtaining sufficient accuracy for pore size determination.

The particular implementation of the Kelvin equation often chosen for measurement of pore size is that reported by Dollimore and Heal (D. Dollimore and G. R. Heal, *J. Applied Chem,* 14, 108 (1964)). This method corrects for the effects of the surface layer of adsorbate on the pore wall, of which the Kelvin equation proper does not take account, and thus provides a more accurate measurement of pore diameter. While the method of Dollimore and Heal was derived for use on desorption isotherms, it can be applied equally well to adsorption isotherms by simply inverting the data set.

Transmission Electron Microscopy

In order to illuminate the microstructure of materials by transmission electromicroscopy (TEM), samples must be thin enough for an electron beam to pass through them, generally about 500–1000 Å or so thick. The crystal morphology of the present materials usually required that they be prepared for study by ultramicrotomy. While time consuming, this technique of sample preparation is quite familiar to those skilled in the art of electron microscopy. The materials are embedded in a resin, in this case a commercially available low viscosity acrylic resin L.R. WHITE (hard), which is then cured at about 80° C. for about 1½ hours. Thin sections of the block are cut on an ultramicrotome using a diamond knife and sections in the thickness range 500–1000 Å are collected on fine mesh electron microscope support grids. For these materials, an LKB model microtome with a 45° C. diamond knife edge was used; the support grids were 400 mesh copper grids. After evaporation of a thin carbon coating on the sample to prevent charging in the microscope (light gray color on a white sheet of paper next to the sample in the evaporator), the samples are ready for examination in the TEM.

High resolution TEM micrographs show projections of structure along the direction that the sample is viewed. For this reason, it is necessary to have a sample in specific orientations to see certain details of the microstructure of the material. For crystalline materials, these orientations are most easily chosen by observing the electron diffraction pattern (EDP) that is produced simultaneously with the electron microscope image. Such EDPs are readily produced on modern TEM instruments using, e.g. the selected area field limiting aperture technique familiar to those skilled in the art of electron microscopy. When an EDP with the desired arrangement of diffraction spots is observed, the corresponding image of the crystal giving that EDP will reveal details of the microstructure along the direction of projection indicated by the EDP. In this way, different projections of a crystal's structure can be observed and identified using TEM.

In order to observe the salient features of the crystalline product, it is necessary to view the material in an orientation wherein the corresponding EDP gives a hexagonal arrangement of diffraction spots from a single individual crystal. If multiple crystals are present within the field limiting aperture, overlapping diffraction patterns will occur that can be quite difficult to interpret. The number of diffraction spots observed depends to a degree upon the regularity of the crystalline arrangement in the material, among other things. At the very least the inner ring of bright spots should be observed to obtain a good image. Individual crystals can be manipulated by specimen tilt adjustments on the TEM until this orientation is achieved. More often, it is easier to take advantage of the fact that the specimen contains many randomly oriented crystals and to simply search through the sample until a crystal giving the desired EDP (and hence orientation) is located. This latter technique was used to produce the electron micrographs.

Microtomed samples of materials from the Examples were examined by the techniques described above in a JEOL 200 CX transmission electron microscope operated at 200,000 volts with an effective 2 Å objective aperture in place. The instrument has a point-to-point resolution of 4.5 Å. Other experimental arrangements familiar to one skilled in the art of high resolution (phase contrast) TEM could be used to produce equivalent images provided care is taken to keep the objective lens on the underfocus (weak leans) side of the minimum contrast lens current setting.

EXAMPLES 21-24

The following examples demonstrate the wax hydrocracking/hydroisomerization process using a heavy neutral wax feed.

EXAMPLE 21

This example provides a comparison with an amorphous catalyst. The feed was a heavy neutral (HN) slack wax whose properties are listed in Table 4 below.

TABLE 4

| Properties of Heavy Neutral Slack Wax | |
|---|---|
| Hydrogen, wt % | 14.56 |
| Nitrogen, ppm | 54 |
| Sulfur, wt % | 0.102 |
| API Gravity | 34.9 |
| KV @ 100° C., cS | 7.117 |
| Solvent Extractables, wt % (D3235) | 34.05 |
| Simulated Distillation, °F. | |
| IBP/5 | 736/805 |
| 10/20 | 828/858 |
| 30/40 | 879/898 |
| 50/60 | 916/936 |
| 70/80 | 957/982 |
| 90/EP | 1014/1095 |
| Dewaxed Oil Properties | |
| Nitrogen, ppm | 95 |
| Sulfur, wt % | 0.220 |
| Pour point, °F. | 0 |
| KV @ 40° C., cS | 92.04 |
| KV @ 100° C., cS | 10.53 |
| VI | 96.2 |
| Composition, wt % | |
| Paraffins | 23.2 |
| Mononaphthenes | 19.4 |
| Polynaphthenes | 37.1 |
| Aromatics | 20.3 |

The feed was processed over a fixed bed reactor containing NiW/alumina fluorided catalyst that was sulfided and then fluorided in-situ by adding 600 ppm of fluorine as orthofluorotoluene in the slack wax feed for approximating one week to target a fluorine level of 2-4 wt % on catalyst. The operating conditions for the run were 2000 psig hydrogen pressure 1 LHSV and the reactor temperature was varied from 705° to 755° F. to cover a wide conversion range. The total liquid product from the hydrocracking step was then distilled to a nominal 650° F.+ cut point. The bottoms fraction was then solvent dewaxed to a target 0° F. pour point. The results of these runs are summarized in Table 5 below.

TABLE 5

| Wax Hydrocracking — NiW/Al$_2$O$_3$ Catalyst | | | | | | | |
|---|---|---|---|---|---|---|---|
| Mass Bal. No. | 411 | 412 | 413 | 415 | 416 | 417 | 418 |
| Reactor temp, °F. | 740 | 750 | 755 | 735 | 725 | 715 | 705 |
| 650° F.— Conv, wt % | 28 | 40 | 48 | 23 | 17 | 10 | 9 |
| Lube Properties | | | | | | | |
| KV @ 100° C. | 5.0 | 4.3 | 4.0 | 5.1 | 5.4 | 5.9 | 6.7 |
| VI | 137 | 143 | 140 | 146 | 141 | 137 | 131 |
| Pour Point, °F. | 5 | 0 | −5 | 0 | −5 | 5 | 15 |
| VI @ 0° F. Pour | 136 | 143 | 141 | 146 | 142 | 136 | 128 |
| Lube Yield, wt % | 40 | 43 | 42 | 40 | 34 | 33 | 29 |
| Wax Conversion | 50 | 74 | 84 | 42 | 24 | 12 | 4 |

Boiling point conversion is defined as:

$$650° \text{ F.}- \text{ conversion} = \frac{650° \text{ F.}+ \text{ in Feed} - 650° \text{ F.}+ \text{ in Product}}{650° \text{ F.}+ \text{ in Feed}}$$

Wax Conversion is defined as:

$$\text{Wax Conversion} = \frac{\text{Wt \% Wax in Feed} - (\text{Wt \% Unconverted Wax after Solvent Dewaxing})}{\text{Wt \% Wax in Feed}}$$

EXAMPLE 22

This example illustrates the use of the ultra-large pore size catalysts.

A NiW/MCM-41 catalyst was prepared as described below.

A sample of MCM-41 (40 Å) was prepared by crystallizing the following mixture (parts by weight) in an autoclave:

48 parts Cetyltrimethylammonium (CTMA) hydroxide, prepared by contacting a 29 wt. % N,N,N-trimethyl-1-hexadecylammonium chloride solution with a hydroxide-for-halide exchange resin 1 part Sodium aluminate, 24 parts Tetramethylammonim silicate (10% aqueous solution), 6 parts Precipitated hydrated silica (Hisil, TM ).

The mixture was crystallized at 100° C. for 24 hours with stirring under autogeneous pressure. The resulting product was recovered by filtration and dried in air at ambient temperature. A sample of the product was calcined at 540° C. for 1 hour in nitrogen, followed by 6 hours in air. The characterisitics of the product were consistent with its identity as MCM-41.

The MCM-41 was exchanged with room temperature aqueous solutions of ammonium nitrate and subsequently dried overnight at 250° F. A portion of the resultant crystals was combined with Al$_2$O$_3$ to form a mixture of 65 parts, by weight MCM-41 and 35 parts alumina. Water was added to this mixture to allow the resulting catalyst to be formed into extrudates. The catalyst was activated by calcination at 950° F. in 5v/v/min of nitrogen for 6 hours followed by the replacement of the nitrogen with 5v/v/min of air. The calcination was completed by raising the temperature to 1000° F. and maintaining that temperature in 5v/v/min air for 18 hours. Nickel and tungsten were incorporated by incipient wetness coimpregnation using solutions of Ni(NO$_3$)$_2$.6H$_2$O and (NH$_4$)$_6$H$_2$W$_{120}$.40H$_2$O. After drying for 12 hours at 250° F., the extrudate was calcined in 5v/v/min air at 1000 F for 3 hours.

The physical and chemical properties of the NiW/MCM-41/Al2O3 catalyst are set out below:

| | |
|---|---|
| Nickel, wt % | 5.8 |
| Tungsten, wt % | 29.1 |
| Sodium, ppm | 200 |
| Surface Area, m2/g | 242 |
| Packing Density, g/cc | 0.749 |

This catalyst was used for wax hydrocracking/hydroisomerization at the following process conditions: 2000 psig hydrogen pressure, 7500 SCF/Bbl hydrogen circulation and 1 LHSV, as in Example 21, using the same wax feed as in Example 21. The operating temperature was adjusted from 720 to 746° F. to span a range of 650° F.— boiling point conversions. Product workup was the same as in Example 21, that is, by distillation to a 650° F.+ cutpoint followed by solvent dewaxing to a 0° F. pour point. The results of these runs are given in Table 6.

TABLE 6

Wax HDC/HDI

| Mass Bal. No. | 82 | 84 | 85 | 86 | 87 | 88 | 90 | 92 |
|---|---|---|---|---|---|---|---|---|
| Reactor temp, °F. | 720 | 725 | 725 | 733 | 732 | 740 | 746 | 731 |
| 650° F.- Conv, wt % | 18.4 | 21.5 | 23.6 | 29.2 | 29.8 | 41.1 | 59.5 | 35.6 |
| Lube Properties: | | | | | | | | |
| KV @ 100° | 5.81 | 5.47 | 5.30 | 4.86 | 4.857 | 4.55 | 4.29 | 5.02 |
| VI | 143.6 | 145.7 | 144.3 | 142.8 | 145.7 | 142.0 | 141.3 | 145.6 |
| Pour Point, °F. | 20 | 5 | 5 | 5 | 5 | 10 | 10 | 5 |
| VI @ 0°F. Pour Pt | 139.6 | 144.7 | 143.3 | 141.8 | 144.7 | 140 | 139.3 | 144.6 |
| Lube Yield, wt % | 39.5 | 38.6 | 40.3 | 47.6 | 44.3 | 47.5 | 43.9 | 47.2 |
| Wax Conversion | 42.3 | 49.6 | 42.7 | 65.4 | 68.7 | 81.3 | 84.7 | 65.6 |

FIG. 1 of the drawings shows that the activity of the NiW/MCM-41 is higher than the activity of the fluorided NiW/alumina catatlyst. For example, at 30 wt % 650° F.— conversion, the fluorided catalyst required a 742° F. reactor temperature, whereas, the MCM-41 catalyst required about 10° F. lower temperature of 732° F. In the preferred boiling point conversion range of ( about 30-60 wt % 650° F.— conversion or greater, this activity advantage is beneficial in terms of lower start-of-cycle temperature and potentially longer catalyst life.

Figure 2:
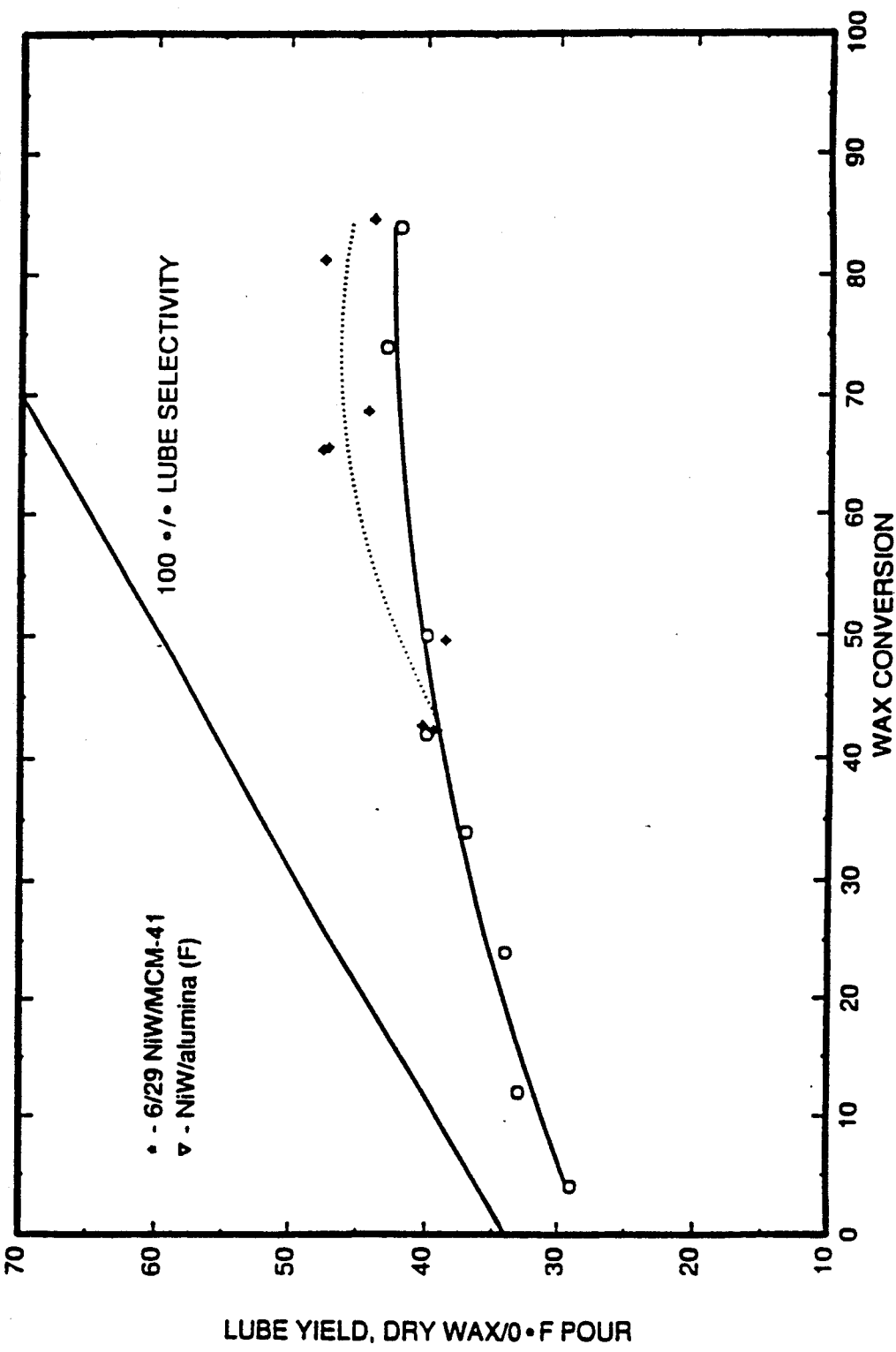

FIG. 2 shows that the lube yield for the fluorided NiW/alumina and the NiW/MCM-41 catalysts are similar at low wax conversions below 50 wt %, but at higher wax conversion the unpromoted NiW/MCM-41 catalyst has a desirable yield number benefit compared to the fluorided NiW/alumina catalyst.

Figure 3:
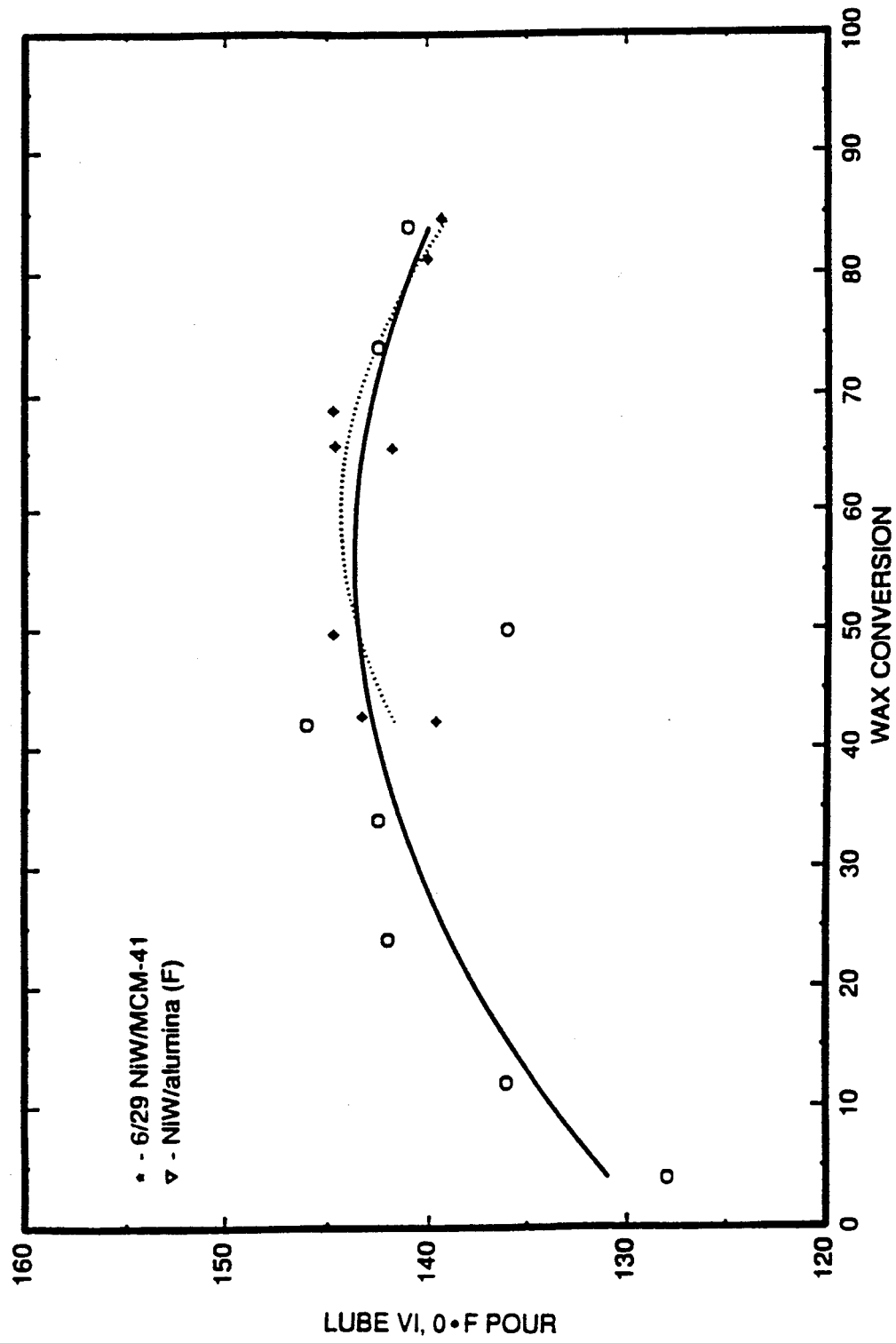

FIG. 3 shows that the lube VI of the NiW/MCM-41 is comparable to the VI obtained with the fluorided NiW/alumina catalyst.

Figure 4:
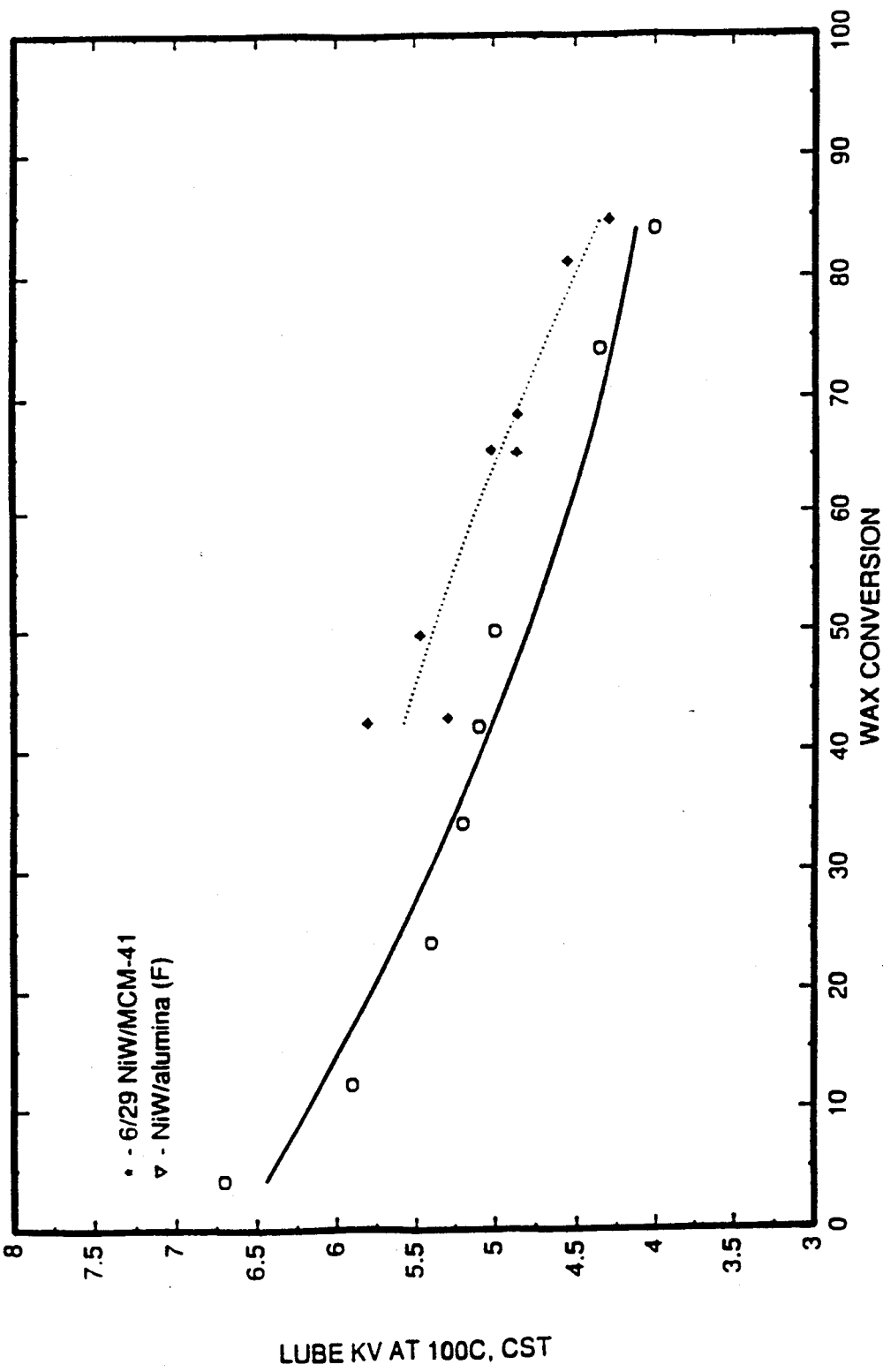

FIG. 4 shows a viscosity benefit of the MCM-41 products. At a given wax conversion the lubes obtained from the MCM-41 based catalyst are higher in viscosity than the fluorided amorphous catalyst. Since the wax hydrocracking/hydroisomerization process significantly reduces the viscosity of the hydrocracked/ hydroisomerized feed, it is desirable to maintain viscosity as high as possible. For example, the target viscosity for this feed is 5 cS at 100° C.; the fluorided alumina catalyst can achieve this at 50 wt % wax conversion. The MCM-41 can operate at much higher wax conversion of 65 wt % and still achieve target viscosity. There are significant commercial benefits to operating at higher wax conversion, such as, reduction in MEK loading with higher wax conversion and reduction in size of the unconverted wax recycle stream.

A hydrotreating reactor may be provided downstream of the hydroisomerization reactor to further stabilize the lube product.

We claim:

1. A process for producing lubricant products of high viscosity index lube hydrocracking process by the hydrocracking/hydroisomerization of a petroleum wax feed, which comprises subjecting the wax feed to hydrocracking and hydroisomerization in the presence of a bifunctional hydrocracking catalyst having acidic functionality and hydrogenation-dehydrogenation functionality, and comprising an inorganic, non-layered, porous, crystalline phase material having pores with diameters of at least about 13 Å and exhibiting, after calcination, an X-ray diffraction pattern with at least one peak with a relative intensity of 100 at a d-spacing greater than about 18 Å to produce a lube boiling range product.

2. A process acccording to claim in which the crystalline phase material has, after calcination, a hexagonal arrangement of uniformly-sized pores with diameters of at least about 13 Å and exhibits a hexagonal electron diffraction pattern that can be indexed with a $d_{100}$ value greater than about 18 Å.

3. A process according to claim 1 in which the crystalline phase has an X-ray diffraction pattern following calcination with at least one peak whose d-spacing corresponds to the $d_{100}$ value from the electron diffraction pattern.

4. A process according to claim 1 in which the crystalline phase exhibits a benzene adsorption capacity of greater than about 15 grams benzene per 100 grams at 50 torr and 25° C.

5. A process according to claim 1 in which the crystalline phase has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and (a+b+c+d)=1.

6. A process according to claim 4 wherein W comprises a divalent first row transition metal or magnesium; X comprises aluminum, boron, gallium or iron; Y comprises silicon or germanium; and Z comprises phosphorus.

7. A process according to claim 4 wherein a and d are 0 and h=2.

8. A process according to claim 7 wherein X comprises aluminum, boron, gallium or iron and Y comprises silicon or germanium.

9. A process according to claim 8 wherein X comprises aluminum and Y comprises silicon.

10. A process according to claim 1 in which the catalyst comprises at least one metal of Groups VIA, VIIA or VIIIA of the Periodic Table.

11. A process according to claim 1 in which the catalyst comprises at least one metal of Group VIA and at least one metal of Group VIIIA of the Periodic Table.

12. A process according to claim 1 in which the feed is contacted with the catalyst at a pressure of from 1,000 to 3,000 psig (hydrogen partial pressure, reactor inlet), a temperature from 550° to 825° F., and a space velocity from 0.2 to 4.0 LHSV.

13. A process according to claim 12 in which the feed is contacted with the catalyst at a pressure of from 1,450 to 2,600 psig (hydrogen partial pressure, reactor inlet), a temperature from 650° to 800° F., and a space velocity from 0.5 to 2.0 LHSV.

14. A process according to claim 1 in which the hydrocracking is carried out in the absence of any promoter which increases the acid acidity of the catalyst.

15. A process according to claim 1 in which the hydrocracking is carried out in the absence of fluorine or any fluorine compound promoter.

16. A process according to claim 1 in which the hydrocarbon feed comprises a petroleum wax having a wax content of at least 50 weight percent.

17. A process according to claim 16 in which the feed comprises a slack wax having an oil content of from about 20 to about 40 weight percent.

18. A process according to claim 1 in which the hydrocracked product has a viscosity index of at least 135.

19. A process according to claim 1 in which the hydrocracked product has a viscosity index from 140 to 147.

20. A process according to claim in which the hydrocracked/hydroisomerized product is dewaxed.

21. A process for producing lubricant products of high viscosity index lube hydrocracking process by the hydrocracking/hydroisomerization of a petroleum wax feed, which comprises subjecting the wax feed to hydrocracking the hydroisomerization in the presence of a bifunctional hydrocracking catalyst having acidic functionality and hydrogenation-dehydrogenation functionality, and comprising an inorganic, porous, crystalline phase material having a hexagonal arrangement of uniformly-sized pores with diameters of at least about 13 Å and exhibiting, after calcination, an X-ray diffraction pattern with at least one peak with a relative intensity of 100 at a d-spacing greater than about 18 Å and a hexagonal electron diffraction pattern that can be indexed with a $d_{100}$ value greater than about 18 Å, to produce a lube boiling range product.

22. A process according to claim 21 in which the crystalline phase has an X-ray diffraction pattern following calcination with at least one peak whose d-spacing corresponds to the $d_{100}$ value from the electron diffraction pattern.

23. A process according to claim 21 in which the crystalline phase exhibits a benzene adsorption capacity of greater than about 15 grams benzene per 100 grams at 50 torr and 25° C.

24. A process according to claim 21 in which the crystalline phase has a composition expressed as follows:

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; Z is one or more trivalent elements; Y is one or more tetravalent elements; Z is one or more pentavalent elements; a, b, c, and d are more fractions of W, X, Y, and Z, respectively; h is a number of from 1 to 2.5; and $(a+b+d+d)=1$.

25. A process according to claim 24 wherein W comprises a divalent first row transition metal or magnesium; X comprises aluminum, boron, gallium or iron; Y comprises silicon or germanium; and Z comprises phosphorus.

26. A process according to claim 24 wherein a and d are 0 and h=2.

27. A process according to claim 26 wherein X comprises aluminum, boron, gallium or iron and Y comprises silicon or germanium.

28. A process according to claim 27 wherein X comprises aluminum and Y comprises silicon.

29. A process according to claim 21 in which the catalyst comprises a metal component of at least one metal of Group VIA and at least one metal of Group VIIIA of the Periodic Table to provide the hydrogenation/dehydrogenation functionality.

30. A process according to claim 21 in which the feed is contacted with the catalyst at a pressure of from 1,000 to 3,000 psig (hydrogen partial pressure, reactor inlet), a temperature from 550° to 825° F., and a space velocity from 0.2 to 4.0 LHSV.

31. A process according to claim 21 in which the feed is contacted with the catalyst at a pressure of from 1,450 to 2,600 psig (hydrogen partial pressure, reactor inlet), a temperature from 650° to 800° F., and a space velocity from 0.5 to 2.0 LHSV.

32. A process according to claim 21 in which the hydrocracking is carried out in the absence of fluorine or any fluorine compound promoter.

33. A process according to claim 21 in which the hydrocarbon feed comprises a petroleum wax having a wax content of at least 50 weight percent.

34. A process according to claim 21 in which the feed comprises a slack wax having an oil content of from about 20 to about 40 weight percent.

35. A process according to claim 21 in which the hydrocracked lubricant fraction is dewaxed.

* * * * *